UNITED STATES PATENT OFFICE.

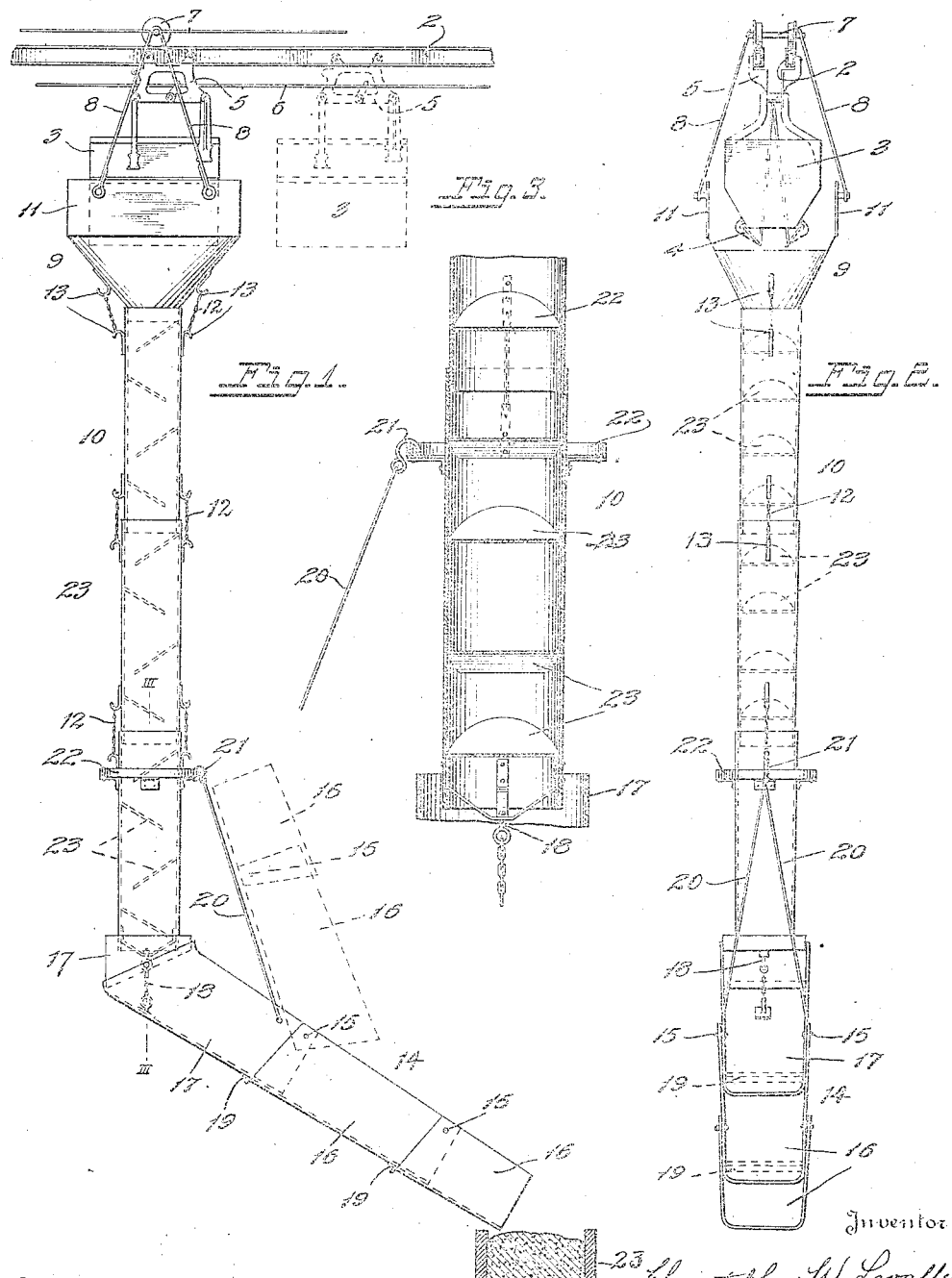

CHRISTOPHER W. LEVALLEY AND SAMUEL SHAFER, JR., OF MILWAUKEE, WISCONSIN, ASSIGNORS TO CHAIN BELT COMPANY, OF MILWAUKEE, WISCONSIN, A CORPORATION OF WISCONSIN.

APPARATUS FOR DELIVERING CONCRETE AND OTHER MATERIAL.

1,230,820. Specification of Letters Patent. Patented June 19, 1917.

Application filed November 3, 1914. Serial No. 870,110.

*To all whom it may concern:*

Be it known that we, CHRISTOPHER W. LEVALLEY and SAMUEL SHAFER, Jr., citizens of the United States, residing at Milwaukee, in the county of Milwaukee and State of Wisconsin, have invented certain new and useful Improvements in Apparatus for Delivering Concrete and other Material, of which the following is a specification.

This invention relates to apparatus for delivering mixed concrete and other material.

In the accompanying drawings—

Figure 1 is a side elevation of apparatus embodying our improvements.

Fig. 2 is an end view of the apparatus.

Fig. 3 is a vertical section through the lower end of the chute.

Referring to the drawings, 2 designates a track or overhead way. This is preferably formed of a pair of parallel channel bars mounted edgewise so that the upper flanges of the bars may constitute one track and the lower flanges a second track, these two being thus disposed in vertical planes preferably one directly above the other.

3 represents a carrier for the material which is preferably in the form of a bucket having doors 4 controlling the opening through which the material is discharged, the movements of the doors being preferably controlled automatically. The bucket is suspended from a wheeled carriage 5 traveling upon one of the tracks of the overhead support 2,—that formed by the lower pair of flanges, in the arrangement illustrated in the drawings. The bucket or carrier 3 may be moved back and forth along the way 2 by any suitable means, typified by the cable 6.

7 designates a trolley arranged to travel upon the upper part of the track 2. From this trolley is suspended, by links 8, a chute 10. The chute is provided at its upper end with a hopper 9 that receives the material from the carrier 3 and delivers to the trunk or conveyer portion of the chute. The hopper is preferably provided with a pair of side plates 11, to which the links are connected, arranged parallel with the track 2. It is supported at such distance below the path of the carrier or bucket 3 that the latter may be easily passed over it to discharge its contents thereinto. The side plates 12 of the hopper extend, however, some distance above the bottom of the bucket and constitute a passage open at each end through which the bucket may be freely passed. This arrangement permits the bucket to approach the hopper of the chute from either direction, or to enter it from one direction, come to rest over the hopper and discharge its load, and then pass along in the same direction.

The chute 10 is formed of a series of sections preferably tubular in shape and telescoping one into the other at their ends, thus permitting the chute to be built up so as to be of any length. The upper section of the chute is connected with the hopper, and the sections with each other, by means of short chains 11 that engage with hooks 13 secured respectively to the hopper and to the chute sections near the ends of the latter.

While the chute 10 may deliver directly to the places where the concrete is to be used, it is usually desirable or necessary to employ a spout adapted to divert the material laterally to which the chute delivers. This spout is preferably formed of a series of sections 16 pivotally connected with each other as represented at 15 and united with the chute so as to be free to swivel or swing horizontally relative thereto. The sections of the spout are of open trough shape and the inner or upper one is provided with an elbow section 17. This is of considerably larger diameter than is the chute 10 so that the lower end of the latter fits freely into the said elbow as represented in the drawings. The spout may be supported from the chute by chains in the same manner that the sections of the spout are supported one from the other. We prefer, however, to unite these parts by a flexible swivel connection 18 disposed on the line of the longitudinal axis of the chute, which permits the spout to be easily turned in any direction desired.

The spout sections are arranged so that when extended as represented in full lines, Fig. 1, they form a comparatively rigid structure. To insure this we prefer to arrange each succeeding or lower section so that its upper end overlaps the lower end of the section next above, and the lower edge of its upper end engages with a stop 19 carried by the connected section above when the section is let down or extended and in position for use. In order to sustain the spout in the desired inclined position for use we employ guys 20 secured at their lower ends to one of the spout sections, preferably the upper one, and at their upper ends to a hook 21 adapted to engage with a ring 22 secured to the lower section of the chute. This arrangement permits an adjustment of the connection of the guys with their upper support,—the ring 22—, corresponding with the angular adjustment which may be given to the spout.

When the apparatus is to be shifted or adjusted the lower sections of the spout may be folded up as indicated in dotted lines in Fig. 1 and allowed to rest against the guys 20.

It has been found that where concrete is delivered through a vertically disposed chute, particularly when the latter is long, there is a tendency for the ingredients of the aggregate of the concrete to separate, the coarser material, such as broken rock, tending to move more rapidly through the spout than do the finer materials.

In order to overcome this tendency and to insure a constant remixing of the ingredients as they pass through the chute, as well as to retard the speed at which the concrete flows through the chute, we provide the latter with a series of oppositely inclined baffle plates 23, arranged in staggered relation to each other, that is, successively one above the other and secured alternately to opposite sides of the chute. The result of this arrangement is that the concrete arrives at the spout in as complete mixed a condition as it was when delivered to the hopper 9.

An arrangement such as we have shown has many desirable features. The chute is easily adjustable from place to place along the track or way 2, which track serves also as the support for the delivery buckets or carriers. Material may be delivered to the chute from either direction and indeed may be fed from both directions, separate buckets approaching it from opposite directions and delivering thereto alternately. It will be seen that the supports for the chutes are so arranged that they straddle the carrier or bucket 3 when in position to deliver to the chute, the bucket passing freely between the links 8 as well as between the side plates 12.

The two tracks upon which are respectively supported the chute and the traversing bucket or carrier are preferably conterminous and parallel, thus enabling the chute to be adjusted to any position along the track desired and permitting the bucket or carrier to deliver thereto whatever be its position.

In the drawings 23 indicates a form to which the concrete is finally delivered.

What we claim is:—

1. In apparatus for delivering material, a pair of tracks one vertically directly above the other, a traversing carrier suspended from the lower track along which it is free to move, a chute to which such carrier delivers, and suspending means for the chute supported from the upper track and along which they are free to move, the said suspending means, on opposite sides of the track, being separated sufficiently far to permit the traversing carrier to freely move between them.

2. In apparatus for delivering material, a track structure formed of a pair of channel bars the flanges at the opposite edges of which constitute two sets of track one being higher than the other, a carrier for the material suspended from the lower track along which it is free to move, and a chute to which the carrier delivers suspended from the upper track and freely movable along the same, the suspending means for the chute being adapted to straddle the carrier when the latter is in position to deliver to the chute.

3. In apparatus for delivering material, the combination of a structure having two tracks one higher than the other, a trolley movable along the higher track, a chute having a hopper at its upper end and side plates extending upward from two sides of the hopper suspended from the said trolley, and a carrier suspended from and movable along the lower track arranged to pass between the side plates of the chute and also between the means by which the chute is suspended from the upper track.

4. In apparatus for delivering material, a vertically disposed chute, a lateral delivering spout into which the chute discharges, means pivotally uniting the upper end of the spout with the lower end of the chute arranged to permit the spout to be freely turned about the chute, guys for sustaining the spout in working positions extending laterally away from the chute, and means carried by the chute with which the upper parts of the guys are connected and by which they are supported, the guy connections being freely adjustable upon said means which support them to correspond with the adjustments of the spout about the chute.

5. In apparatus for delivering material, a delivery chute through which material passes by gravity, a spout to which the chute delivers, means uniting the upper end of the spout and the lower end of the chute, constructed to permit the spout to be freely turned relative to the chute as about a vertical axis, a ring supported by the chute, and
5 guys connected with the spout and having at their upper ends means for hooking over the said ring whereby the spout may be sustained in whatever position relative to the chute it may be adjusted.

CHRISTOPHER W. LEVALLEY.
SAMUEL SHAFER, Jr.

Witnesses:
CLIFFORD F. MESSINGER,
JAMES W. BROWN.